United States Patent
Rowe et al.

(10) Patent No.: US 7,231,189 B2
(45) Date of Patent: Jun. 12, 2007

(54) TRANSMIT AND/OR RECEIVE CHANNEL COMMUNICATION SYSTEM WITH SWITCHABLY COUPLED MULTIPLE FILTERING COMPONENTS

(75) Inventors: David A. Rowe, Torrance, CA (US); Craig A. Hornbuckle, Torrance, CA (US); Matthew D. Pope, Rancho Palos Verdes, CA (US)

(73) Assignee: Sierra Monolithics, Inc., Redondo Beach, CA (US)

( * ) Notice: Subject to any disclaimer, the term of this patent is extended or adjusted under 35 U.S.C. 154(b) by 0 days.

(21) Appl. No.: 11/594,914

(22) Filed: Nov. 9, 2006

(65) Prior Publication Data
US 2007/0054628 A1    Mar. 8, 2007

Related U.S. Application Data

(63) Continuation of application No. 10/806,682, filed on Mar. 22, 2004, now Pat. No. 7,155,193.

(51) Int. Cl.
*H04B 15/00* (2006.01)
*H04B 1/44* (2006.01)
*H04B 1/00* (2006.01)

(52) U.S. Cl. .................. 455/78; 455/63.3; 455/306; 455/307

(58) Field of Classification Search .............. 455/78, 455/63.3, 266, 303, 306, 307, 560, 168.1, 455/191.3, 213, 293, 339, 199.1, 225, 338, 455/319; 379/416, 417; 375/316; 370/343
See application file for complete search history.

(56) References Cited

U.S. PATENT DOCUMENTS 5,339,455 A * 8/1994 Vogt et al. ............... 455/266

5,493,717 A * 2/1996 Schwarz .................. 455/306

(Continued)

*Primary Examiner*—Pablo N. Tran
(74) *Attorney, Agent, or Firm*—McDermott Will & Emery LLP

(57) ABSTRACT

A communication system includes a front-end multi-throw switch, a back-end multi-throw switch, multiple filters and a switch controller. The front-end multi-throw switch includes front-end throws and a front-end pole. The front-end pole is coupled to a receive channel or a transmit channel. The front-end pole is switchably coupled to one of the front-end throws. The back-end multi-throw switch includes back-end throws and a back-end pole. Each of the back-end throws is associated with a corresponding one of the front-end throws. The back-end pole is coupled to the receive channel or the transmit channel. The back-end pole is switchably coupled to one of the back-end throws. The one of the back-end throws corresponds to the one of the front-end throws. The filters are interposed between the front-end multi-throw switch and the back-end multi-throw switch. Each of the filters has a first port coupled to one of the front-end throws and a second port coupled to one of the back-end throws. A first one of the filters includes a filter of a first bandwidth. A second one of the filters includes a filter of a second bandwidth. The first bandwidth is different from the second bandwidth. The switch controller is coupled to the front-end multi-throw switch and the back-end multi-throw switch. The switch controller is configured to synchronously switch the front-end pole to one of the front-end throws and the back-end pole to a corresponding one of the back-end throws.

23 Claims, 2 Drawing Sheets

U.S. PATENT DOCUMENTS

| | | | |
|---|---|---|---|
| 5,742,215 A * | 4/1998 | Park | 333/204 |
| 5,758,296 A * | 5/1998 | Nakamura | 455/575.7 |
| 6,047,171 A * | 4/2000 | Khayrallah et al. | 455/266 |
| 6,252,633 B1 * | 6/2001 | Ruitenburg | 348/725 |
| 6,414,570 B1 * | 7/2002 | Dalconzo et al. | 333/202 |
| 6,501,944 B1 * | 12/2002 | Szydlowski et al. | 455/266 |
| 6,553,229 B1 * | 4/2003 | Dent | 455/434 |
| 6,571,081 B1 * | 5/2003 | Reinhardt | 455/12.1 |
| 6,584,304 B1 * | 6/2003 | Thomsen et al. | 455/188.1 |
| 6,662,018 B1 * | 12/2003 | Kintis et al. | 455/522 |
| 6,985,709 B2 * | 1/2006 | Perets | 455/266 |
| 2002/0123306 A1 * | 9/2002 | Masoian | 455/7 |
| 2004/0266379 A1 * | 12/2004 | Woo et al. | 455/188.1 |

\* cited by examiner

US 7,231,189 B2

TRANSMIT AND/OR RECEIVE CHANNEL COMMUNICATION SYSTEM WITH SWITCHABLY COUPLED MULTIPLE FILTERING COMPONENTS

CROSS-REFERENCES TO RELATED APPLICATION

The present application is a continuation of application Ser. No. 10/806,682, filed on Mar. 22, 2004 now U.S. Pat. No. 7,155,193.

FIELD OF THE INVENTION

The present invention relates generally to communication systems, and more specifically to transmit and/or receive channel communication systems having switchably coupled multiple filtering components with variable transmission or reception frequency bandwidths.

BACKGROUND

Present day communication systems are often limited in their reliability and speed by adjacent channel interference. Adjacent channel interference, or "spectral crowding" as it is referred to in wireless communication systems, occurs when one or more received signals occur adjacent to the intended signal, the adjacent signal's proximity and/or signal strength relative to the intended signal being such that the destination receiver is critically limited or unable to process the intended signal accurately. The problem often results in poor quality or dropped connections when a large number of users attempt to use the particular system's available bandwidth, as each user provides a potentially interfering signal to the other's intended signal. In addition, the interference tends to be intermittent; for example, the communication system may be more heavily used during one period of time as opposed to others, or the source of the interference itself may be temporary, e.g., a mobile telephone user who is allocated to an adjacent channel in an otherwise uncrowded spectrum.

FIG. 1 illustrates a conventional transceiver 100 used in establishing a wireless communication network link in which the transmitter and receiver functions are not operated concurrently. The conventional transceiver 100 consists of a transceiver front-end 120, a filter 134 connected between two 2-pole, single throw switches 132 and 136, and a transceiver back-end 140. Each of the 2-pole, single throw switches have a receive pole and a transmit pole. During a receive operation, both switches connect to their receive poles, thereby completing the receive channel through filter 134. Similarly during signal transmission, both switches connect to their transmit poles to complete the transmit channel through the filter 134. Using this transceiver topology, filter 134 may be used in both transmit and receive modes of operation.

The conventional transceiver 100 does not provide a solution to the adjacent channel interference problem, as it employs a single filter 134 which may be too wide in some circumstances, and too narrow in others. For example, when the conventional transceiver 100 is operated in an environment or during a time when there are many adjacent channel users, the filter 136 may be too wide, and not provide the requisite amount of adjacent channel rejection during reception. During other times when adjacent bands are relatively free, the filter 136 may be too narrow, limiting the communication rate unnecessarily.

What is needed is an improved transceiver architecture which is adaptable to limit the transceiver's bandwidth when adjacent signal interference is present, and to widen the transceiver's bandwidth to increase the communication rate when conditions permit.

SUMMARY OF THE INVENTION

The present invention provides a multi-channel filtering system and transceiver architecture which allows for a variable transmission and reception bandwidth. The variable transmission and reception rates enable the transceiver to combat adjacent channel interference when present, and to maximize the communication bandwidth when the spectrum is relatively free of adjacent channel interference.

In one embodiment of the invention, a multi-channel filtering system for use in a transceiver is presented. The multi-channel filtering system includes a front-end multi-pole, multi-throw switch, a back-end multi-pole, multi-throw switch, and a plurality of filters coupled therebetween. The front-end switch includes a receive pole, a transmit pole, and a plurality of switch throws. The back-end switch also includes a receive pole, a transmit pole, and a plurality of switch throws. Each of the plurality of filters has first and second ports, each first port coupled to one of the switch throws of the front-end switch, and each second port coupled to one of the switch throws of the back-end switch. Using this configuration, filters of differing bandwidths can be switched in during signal reception and/or transmission, thereby tailoring the communication rate to the particular interference and data transmission rate conditions.

According to another embodiment of the present invention, a communication system is provided for use with at least one of a receive channel and a transmit channel. The communication system includes a front-end multi-throw switch, a back-end multi-throw switch, a plurality of filters and a switch controller. The front-end multi-throw switch includes a plurality of front-end throws and at least one front-end pole. The front-end pole is configured to couple to or is coupled to one of a receive channel and a transmit channel at a first location. The front-end pole is switchably coupled to one of the plurality of front-end throws. The back-end multi-throw switch includes a plurality of back-end throws, where each of the plurality of back-end throws is associated with a corresponding one of the plurality of front-end throws. The back-end multi-throw switch also includes at least one back-end pole, which is configured to couple to or is coupled to the one of the receive channel and the transmit channel at a second location. The back-end pole is switchably coupled to one of the plurality of back-end throws, and the one of the plurality of back-end throws corresponds to the one of the plurality of front-end throws.

The plurality of filters are interposed between the front-end multi-throw switch and the back-end multi-throw switch. Each of the plurality of filters has a first port coupled to one of the plurality of front-end throws and a second port coupled to one of the plurality of back-end throws. A first one of the plurality of filters includes a filter of a first bandwidth. A second one of the plurality of filters includes a filter of a second bandwidth. The first bandwidth is different from the second bandwidth. The switch controller is coupled to the front-end multi-throw switch and the back-end multi-throw switch. The switch controller is configured to switch the front-end pole to one of the plurality of front-end throws and the back-end pole to a corresponding one of the plurality of back-end throws.

According to one aspect of the present invention, a method is provided for a transceiver communication system for switching in a first filter during communication signal transmission and for switching in a second filter during communication signal reception. The transceiver communication system includes a front-end multi-pole, multi-throw switch, a back-end multi-pole, multi-throw switch, and a plurality of filters. The front-end multi-pole, multi-throw switch includes a front-end receive pole, a front-end transmit pole, and a plurality of front-end throws. The back-end multi-pole, multi-throw switch includes a back-end receive pole, a back-end transmit pole and a plurality of back-end throws. The plurality of filters are interposed between the front-end and back-end multi-pole, multi-throw switches.

The method includes the steps of: receiving a transmit communication signal at the back-end transmit pole during the communication signal transmission; switchably coupling the back-end transmit pole to a first one of the plurality of back-end throws; switchably coupling the front-end transmit pole to a first one of the plurality of front-end throws, where the first one of the plurality of front-end throws corresponds to the first one of the plurality of back-end throws; and completing a transmit channel for the transmit communication signal. The step of completing a transmit channel uses at least the back-end transmit pole, the first one of the plurality of back-end throws, a first one of the plurality of filters, the first one of the plurality of front-end throws and the front-end transmit pole. The first one of the plurality of filters is connected between the first one of the plurality of front-end throws and the first one of the plurality of back-end throws.

The method further includes the steps of: receiving a receive communication signal at the front-end receive pole during the communication signal reception; switchably coupling the front-end receive pole to a second one of the plurality of front-end throws; switchably coupling the back-end receive pole to a second one of the plurality of back-end throws, the second one of the plurality of back-end throws corresponding to the second one of the plurality of back-end throws; and completing a receive channel for the receive communication signal. The step of completing a receive channel uses at least the front-end receive pole, the second one of the plurality of front-end throws, a second one of the plurality of filters, the second one of the plurality of back-end throws and the back-end receive pole. The second one of the plurality of filters is connected between the second one of the plurality of front-end throws and the second one of the plurality of back-end throws.

According to another aspect of the present invention, a method is provided for a transmit and/or receive communication system for synchronously switching in filters having different bandwidths during communication signal transmission or communication signal reception. The transmit and/or receive communication system includes a front-end multi-throw switch, a back-end multi-throw switch, and a plurality of filters. The front-end multi-throw switch includes at least one front-end pole and a plurality of front-end throws. The back-end multi-throw switch includes at least one back-end pole and a plurality of back-end throws. The plurality of filters are interposed between the front-end and back-end multi-throw switches.

The method includes the steps of: receiving a communication signal during communication signal transmission or communication signal reception; synchronously controlling states of the front-end multi-throw switch and states of the back-end multi-throw switch; switchably coupling the at least one back-end pole to one of the plurality of back-end throws; switchably coupling the at least one front-end pole to one of the plurality of front-end throws, where the one of the plurality of front-end throws corresponds to the one of the plurality of back-end throws.

The method further includes the step of completing a communication channel for the communication signal. The step of completing a communication channel uses at least the at least one back-end pole, the one of the plurality of back-end throws, one of the plurality of filters, the one of the plurality of front-end throws and the at least one front-end pole. The one of the plurality of filters is connected between the one of the plurality of front-end throws and the one of the plurality of back-end throws.

These and other features of the invention will be better understood when viewed in light of the following drawings and detailed description.

Figure 1:
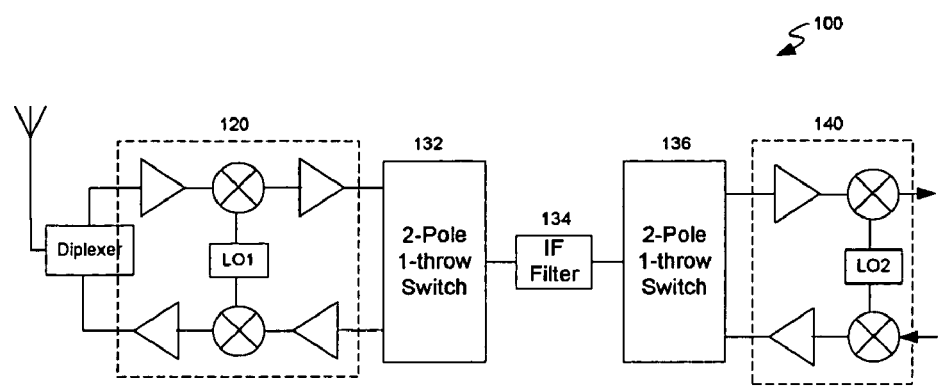
FIG. 1 illustrates a conventional transceiver known in the art.

For clarity and convenience, features and components in earlier drawings retain their reference numerals in subsequent drawings.

DETAILED DESCRIPTION OF THE INVENTION

Figure 2:
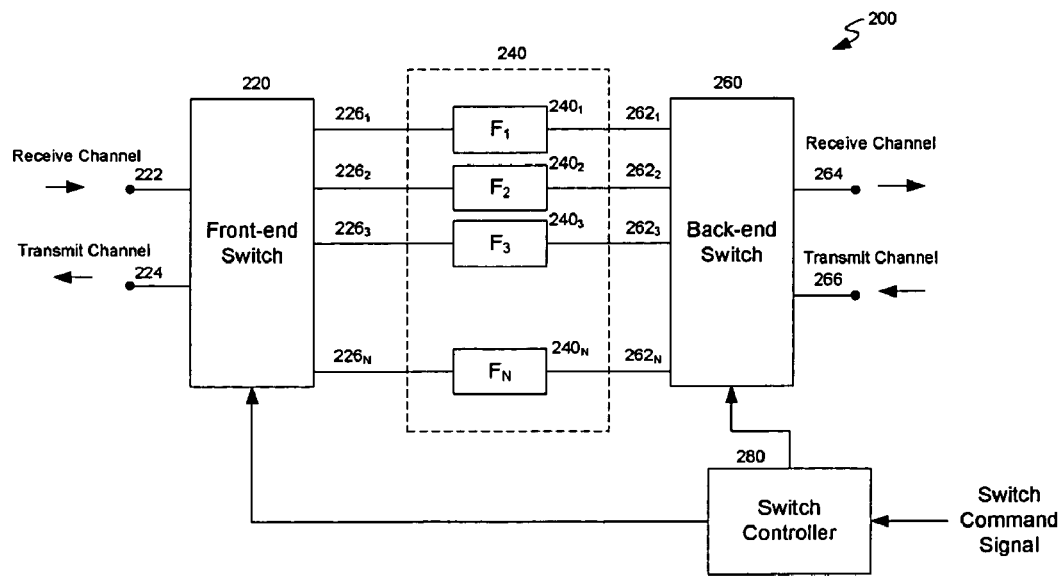
FIG. 2 illustrates a multi-channel filtering system in accordance with one embodiment of the present invention.

FIG. 2 illustrates a multi-channel filtering system in accordance with one embodiment of the present invention. The multi-channel filtering system 200 includes a front-end multi-pole, multi-throw switch 220 ("front-end switch" hereafter), filters $F_{1-N}$ 240, a back-end multi-pole, multi-throw switch 260 ("back-end switch" hereafter), and a switch controller 280. The multi-channel filtering system 200 is designed to intersect the transceiver's transmit and receive channels, thereby providing a range of available transmit and receive bandwidths, as described in greater detail below.

In the exemplary embodiment shown, the front-end switch 220 comprises two poles: a receive pole 222, and a transmit pole 224. The receive pole 222 is configured for coupling to front-end receiver circuitry and components, which may include frequency conversion stages, low noise or buffer amplifiers, limiter and similar components used in the receive channel. The transmit pole 224 is configured for coupling to front-end transmitter circuitry and components, which may include frequency conversion stages, a power amplifier, amplifier linearizer and the like. The front-end switch 220 additionally includes multiple switch throws $226_{1-N}$ to which either of the receive pole 222 or the transmit pole 224 are switchably coupled.

The multi-channel filtering system 200 further includes filters $240_{1-N}$, and a back-end switch 260. Each of the filters $240_{1-N}$ includes a first port coupled to one of the front-end switch throws $226_{1-N}$, and a second port coupled to one of the back-end switch throws $252_{1-N}$. The back-end switch 260 further includes a receive channel pole 264 configured to couple to the receiver back-end circuitry and components such as IF and baseband electronics (e.g., analog-to-digital converters, analog or digital demodulation stages, etc.), and a transmit pole 266 configured to coupled to the transmitter back-end circuitry and components (e.g., digital to analog converters, analog or digital modulation stages, etc.).

In a particular embodiment, filters $F_1$-$F_N$ comprise filters of differing bandwidths to enable a selection between a narrower channel bandwidth, and accordingly greater adjacent cannel noise rejection, or a wider channel bandwidth, and a corresponding faster communication data rate. Further, a particular filter may be selected during signal transmission, and a different filter selected during signal reception. The filters may comprise any particular filter type (e.g., lowpass, bandpass, highpass, bandstop, notch, etc.), and in an exemplary embodiment comprise bandpass filters. Further, the filters 240 may be located external to, or integrated with, the front and back-end switch 220 and 260. For example, in one embodiment the front and back-end switches 220 and 260 and filters 240 are integrally formed in a monolithic integrated circuit. In another embodiment, front and back-end switches 220 and 260 are implemented as integrated circuits, and filters 240 comprise discrete filters, such as surface acoustic wave (SAW) filters. These configurations are only exemplary, and those skilled in the art will appreciate that the present invention may be employed in alternative implementations under the present invention as well.

Responsive to a switch command signal, switch controller 280 is operable to synchronously control the states of front and back-end switches 220 and 260 such that their respective throws are coupled to the same filter, thereby completing either the receive channel between the first and second switch receive poles 222 and 264, or the transmit channel between first and second switch transmit poles 224 and 266. The switch controller comprises a circuit configured to perform the aforementioned operations, and may be realized in analog or digital form, or a combination thereof. Further, the switch command signal may comprise an analog or digitally formatted signal. In a particular embodiment, the switch command signal is a digitally formatted signal, and the switch controller is integrally formed with the front and back-end switches 220 and 260 using a photolithographic semiconductor processing technique.

Figure 3:
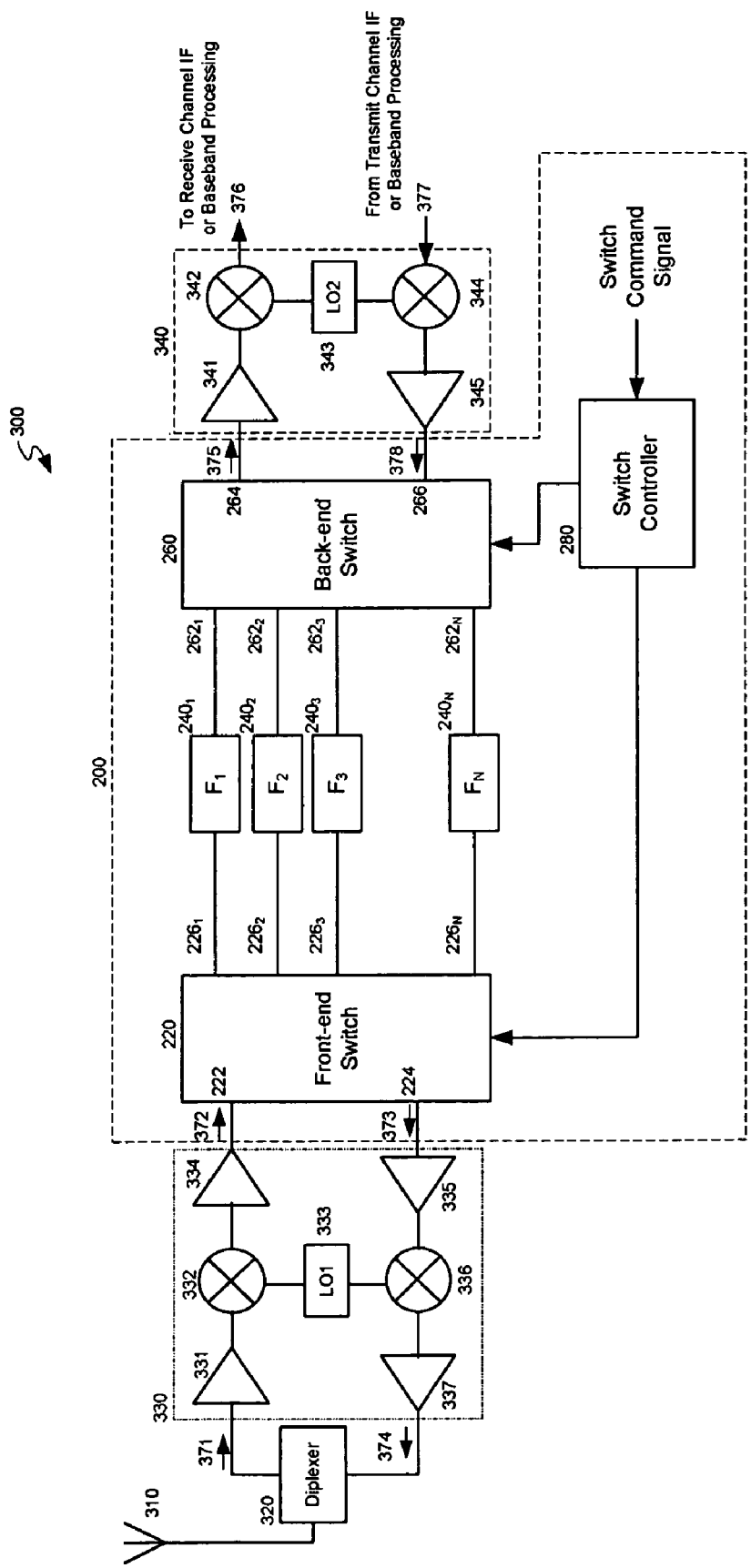
FIG. 3 illustrates a transceiver implementing the multi-channel filtering system in accordance with one embodiment of the present invention.

FIG. 3 illustrates an improved transceiver implementing the multi-channel filtering system in accordance with one embodiment of the present invention, with previously identified features retaining their reference numerals. The improved transceiver 300 includes an antenna 310, a diplexer 320, a transceiver front-end 330, a transceiver back-end 340, and the previously described multi-channel filtering system 200. The antenna 310 provides for the efficient transmission and reception of the desired signal, and may be of any particular type or construction (e.g., directional, omni directional, waveguide, dipole, helix, circular, elliptical or linear polarized, etc.). Diplexer 320 isolates the receive and transmit channels from each other, and allows the sharing of the antenna 310. In an alternative embodiment under the present invention, separate transmit and receive antennas are used. In such an embodiment, the diplexer is not required and may be omitted.

The transceiver front-end 330 includes receive channel components 331-334 which are operable to condition the received signal 371 to the frequency and magnitude desired before processing by the multi-channel filtering system 200. In an exemplary embodiment shown, the receiver channel components include a low noise amplifier 331, a mixer 332, a shared front-end frequency source 333, and a buffer amplifier 334. The low noise amplifier 331 is operable to amplify the received signal with a minimum of additional noise (typically less than 1.5 dB). The amplified signal and a reference signal from the frequency source 333 are supplied to the mixer 332, which produces in response a frequency translated version of the received signal. The front-end source 333 may be a fixed or a variable frequency source, as known in the art. A buffer amplifier 334 provides additional amplification as well as an improved impedance matching and isolation at the multi-channel filtering system interface. The frequency converted receive signal 372 is supplied to the front-end receive pole for filtering. The term "mixer" as used herein is a functional description, and the actual implementation may comprise a single, balanced, doubly balanced mixer, or other frequency converter circuits such as image rejection (or single sideband) mixers known in the art. Further, the frequency translation may be either an upconversion or a downconversion (including zero IF downconversions), depending upon the desired frequency input to the multi-channel filtering system, image rejection requirements, and other transceiver operational requirements.

The transceiver front end 330 further comprises transmit channel components including a buffer amplifier 335, mixer 336, and a power amplifier 337. In a particular embodiment, the front-end source 333 is shared between the receive and transmit channels for component reduction and cost savings. Alternatively, a separate frequency source can be used to supply the reference signal to mixer 336. The buffer amplifier 335 provides impedance-matching and enhanced isolation at the interface of the multichannel filtering system. Mixer 336 and reference source 333 operate to frequency translate the transmit signal 373 to a carrier frequency. Power amplifier 337 amplifies the magnitude of the carrier frequency signal to the transmission power, and the resulting carrier signal 374 is produced. The power amplifier 337 may comprise linearization or predistortion circuitry, as known in the art.

The transceiver back-end 340 includes receive channel components 341-343 and transmit channel components 344 and 345. The receive channel components include a buffer amplifier 341 operable to provide impedance matching and improved isolation between the multi-channel filtering system and subsequent IF or baseband frequency components. Mixer 342 and reference signal output from a second frequency source 343 are operable to frequency translate (up or down) the filtered received signal 375 to a frequency translated signal 376 in the intermediate frequency (IF) or baseband (BB) frequency range. Subsequent IF or BB frequency components may include additional filtering, analog-to-digital converters, demodulation, multiplexing, demultiplexing, and the like.

Transceiver back-end transmit channel components include a mixer 344 and buffer amplifier 345, with the transmit channel components sharing the use of the second frequency source 343. A separate frequency source may be used in an alternative embodiment of the present invention. Mixer 344 receives the IF/BB transmit signal 377 and a second reference signal supplied by the frequency source 343, producing in response, a frequency translated version of the IF/BB transmit signal. Buffer amplifier 345 amplifies the produced signal, and additional provides impedance matching and isolation enhancement.

APPLICATIONS AND SPECIFIC EMBODIMENTS

The systems of the present invention can be used in any application where varying filtering requirements are needed. The need for this capability is especially critical in wireless communication applications that are prone to spectral crowding. For example, mobile telephone users who live in areas covered by two or more service providers are likely to encounter problems, as the frequency band allocated to a telephone call may be very close to those bands allocated to the competitor's service. Also, short and medium range wireless networks such as "WiFi" (IEEE 802.11b), "WiFi-G" (IEEE 802.11g) and "MLAN" (802.16a) are prone to network congestion or failure if an excessive number of users attempt to access the network or allocated too much of the network's bandwidth. In these and similar applications, a transceiver using the multichannel filtering system could be used to vary the receiver and/or transmit channel bandwidth to improve the reliability and speed of the connection. When the network is crowded with adjacent channel users, a link's transmitter and receiver may be configured to synchronously switch in narrow-band filters to increase adjacent band rejection, thereby improving the link's reliability. When network use is light, the link's transmitter and receiver operate to synchronously switch in wider filters to increase the transfer rate. Those skilled in the art will appreciate the many variations possible in this example, for instance the transmitter may be a broadcast transmitter operable to transmit at a certain rate independent of the receiver reception rate. In such an instance, the receiver may be configured (manually or automatically) to switch to a wider or narrow reception bandwidth, depending upon adjacent channel signal conditions.

The communication system may employ time division duplexing (TDD), frequency division duplexing (FDD), or a combination of these two modes. When operated in a TDD mode, the front-end and back-end switches are selected to have fast switching speeds, preferably in the micro-second region or faster, to permit the shortest possible transition time between successive transmit and receive periods. When operated in a FDD mode, the frequency sources are preferably frequency variable and exhibit settling times in the range of micro-seconds of faster. In a hybrid TDD/FDD system, both the switches and the frequency sources are preferably chosen to have fast switching speeds and settling times, respectively.

In a specific implementation of the present invention, a communication link is established between two transceivers employing the multi-filtering system as described herein. Within each transceiver, the front and back-end switches are double-pole, double-throw field-effect transistor (FET) switches and the switch controller circuitry comprises a digital circuit, each of which are monolithically formed on an integrated circuit chip using bipolar complementary metal oxide semiconductor (Bi-CMOS) Silicon-Germanium (SiGe) processing techniques. The front and back-end switches are configured to operate over the 300 MHz-600 MHz frequency ranges. For TDD systems, switching speeds for the front and back-end switches are preferably in the micro-second or faster range. The two filters comprise externally-located SAW bandpass filters each having different 3 dB bandwidths, said filters of nominal 3 dB bandwidth values of 5 MHz to 10 MHz.

Transceiver front-end receive channel components include a low noise amplifier 331, buffer amplifier 334, and gilbert cell doubly balanced mixer 332 fabricated using a Bi-CMOS SiGe semiconductor process. The front-end frequency source 333 comprises a tunable frequency synthesizer. Front-end transmit channel components includes a buffer amplifier 335 and gilbert cell doubly balanced mixer 336 which are monolithically formed using the aforementioned Bi-CMOS SiGe processing techniques. Frequency source 333 is a frequency synthesizer and is shared between the receive and transmit channels. In an alternative embodiment, e.g., a non-frequency division duplexed TDD system, the frequency source may comprise a fixed frequency source. The power amplifier 337 comprises a discrete pseudo-morphic high electron mobility transistor (pHEMT) amplifier having linearizer or predistortion circuitry for improving power efficiency and linearity.

Receive channel components in the transceiver back-end 340 include a buffer amplifier 341, back-end frequency source 343 and gilbert cell mixer 342 operable to downconvert the filter first IF signal 375 to a second IF or baseband signal 376. In a particular embodiment, the buffer amplifier, synthesizer, and mixer are monolithically formed using the aforementioned semiconductor processing techniques. Transmit channel components in the transceiver back-end include a gilbert cell mixer 344 and buffer amplifier 345 (both fabricated using the aforementioned semiconductor processing), with back-end frequency source 343 comprising a tunable synthesizer which is shared between the receive and transmit channels. As noted above, the frequency synthesizer may be replaced with a fixed frequency source in other embodiments under the present invention.

The foregoing description has been presented for purposes of illustration and description. It is not intended to be exhaustive or to limit the invention to the precise form disclosed, and obviously many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A communication system for use with at least one of a receive channel and a transmit channel, the communication system comprising:
   a front-end multi-throw switch including:
      a plurality of front-end throws; and
      at least one front-end pole configured to couple to or coupled to one of a receive channel and a transmit channel at a first location, the at least one front-end pole switchably coupled to one of the plurality of front-end throws;
   a back-end multi-throw switch including:
      a plurality of back-end throws, each of the plurality of back-end throws associated with a corresponding one of the plurality of front-end throws; and
      at least one back-end pole configured to couple to or coupled to the one of the receive channel and the transmit channel at a second location, the at least one back-end pole switchably coupled to one of the plurality of back-end throws, the one of the plurality of back-end throws corresponding to the one of the plurality of front-end throws;
   a plurality of filters interposed between the front-end multi-throw switch and the back-end multi-throw switch, each of the plurality of filters having a first port coupled to one of the plurality of front-end throws and a second port coupled to one of the plurality of back-end throws, a first one of the plurality of filters comprising a filter of a first bandwidth, a second one of the plurality of filters comprising a filter of a second bandwidth, the first bandwidth being different from the second bandwidth; and a switch controller coupled to the front-end multi-throw switch and the back-end multi-throw switch, the switch controller configured to switch the at least one front-end pole to one of the plurality of front-end throws and the at least one back-end pole to a corresponding one of the plurality of back-end throws.

2. The communication system of claim 1, wherein the switch controller is a synchronous switch controller configured to synchronously switch the at least one front-end pole to one of the plurality of front-end throws and the at least one back-end pole to a corresponding one of the plurality of back-end throws.

3. The communication system of claim 1, wherein at least one of the plurality of filters comprises a surface acoustic wave (SAW) filter.

4. The communication system of claim 1, wherein the front-end multi-throw switch comprises a control signal input for receiving a switch signal operable to select which of the plurality of front-end throws to couple to the at least one front-end pole; and
wherein the back-end multi-throw switch comprises a control signal input for receiving a switch signal operable to select which of the plurality of back-end throws to couple to the at least one back-end pole.

5. The communication system of claim 1, wherein the front-end multi-throw switch and the back-end multi-throw switch are configured to operate at about 300 MHz-600 MHz frequency ranges.

6. The communication system of claim 1 further comprising:
a first frequency converter coupled to the at least one front-end pole, the first frequency converter having a first input for receiving a first signal, a second input for receiving a first reference signal, and a first output for providing a second signal comprising a frequency-translated version of the first signal.

7. The communication system of claim 1, wherein the front-end multi-throw switch includes an input, and the back-end multi-throw switch includes an input,
the switch controller includes an input, a first output coupled to the input of the front-end multi-throw switch, and a second output coupled to the input of the back-end multi-throw switch,
the switch controller operable to receive a switch command, and to output, in response, a first switch control signal to the input of the front-end multi-throw switch, and a second switch control signal to the input of the back-end multi-throw switch,
the switch controller operable to synchronously control states of the front-end and back-end multi-throw switches so that respective throws of the front-end and back-end multi-throw switches are coupled to one of the plurality of filters to complete either the receive channel between the at least one front-end pole and the at least one back-end pole or the transmit channel between the at least one front-end pole and the at least one back-end pole, and
the switch controller is configured to synchronously switch the at least one front-end pole to one of the plurality of front-end throws and the at least one back-end pole to a corresponding one of the plurality of back-end throws during signal reception or during signal transmission.

8. The communication system of claim 1, wherein the communication system is included in a mobile telephone, a WiFi network, a WiFi-G network or an MLAN network.

9. The communication system of claim 6 further comprising a reference signal source coupled to the first frequency converter, wherein the reference signal source is a frequency synthesizer.

10. The communication system of claim 6 further comprising a second frequency converter coupled to the at least one back-end pole, the second frequency converter having a third input for receiving a third signal, a fourth input for receiving a second reference signal, and a second output for providing a fourth signal comprising a frequency-translated version of the third signal,
wherein if the at least one front-end pole is configured to couple to or coupled to the receive channel, then the first frequency converter comprises a downconverter circuit,
if the at least one front-end pole is configured to couple to or coupled to the transmit channel, then the first frequency converter comprises an upconverter circuit,
if the at least one back-end pole is configured to couple to or coupled to the receive channel, then the second frequency converter comprises a downconverter circuit, and
if the at least one back-end pole is configured to couple to or coupled to the transmit channel, then the second frequency converter comprises an upconverter circuit.

11. A method for a transceiver communication system for switching in a first filter during communication signal transmission and for switching in a second filter during communication signal reception, the transceiver communication system comprising a front-end multi-pole, multi-throw switch, a back-end multi-pole, multi-throw switch, and a plurality of filters, the front-end multi-pole, multi-throw switch including a front-end receive pole, a front-end transmit pole, and a plurality of front-end throws, the back-end multi-pole, multi-throw switch including a back-end receive pole, a back-end transmit pole and a plurality of back-end throws, the plurality of filters interposed between the front-end and back-end multi-pole, multi-throw switches, the method comprising steps of:
receiving a transmit communication signal at the back-end transmit pole during the communication signal transmission;
switchably coupling the back-end transmit pole to a first one of the plurality of back-end throws;
switchably coupling the front-end transmit pole to a first one of the plurality of front-end throws, the first one of the plurality of front-end throws corresponding to the first one of the plurality of back-end throws;
completing a transmit channel for the transmit communication signal using at least the back-end transmit pole, the first one of the plurality of back-end throws, a first one of the plurality of filters, the first one of the plurality of front-end throws and the front-end transmit pole, the first one of the plurality of filters connected between the first one of the plurality of front-end throws and the first one of the plurality of back-end throws;
receiving a receive communication signal at the front-end receive pole during the communication signal reception;
switchably coupling the front-end receive pole to a second one of the plurality of front-end throws;
switchably coupling the back-end receive pole to a second one of the plurality of back-end throws, the second one of the plurality of back-end throws corresponding to the second one of the plurality of back-end throws; and completing a receive channel for the receive communication signal using at least the front-end receive pole, the second one of the plurality of front-end throws, a second one of the plurality of filters, the second one of the plurality of back-end throws and the back-end receive pole, the second one of the plurality of filters connected between the second one of the plurality of front-end throws and the second one of the plurality of back-end throws.

12. The method of claim 11 further comprising:
receiving a switch command signal at a switch controller,
synchronously controlling states of the front-end multi-pole, multi-throw switch and states of the back-end multi-pole, multi-throw switch,
wherein the step of synchronously controlling states of the front-end multi-pole, multi-throw switch and states of the back-end multi-pole, multi-throw switch is performed in response to receiving the switch command signal.

13. The method of claim 11 further comprising:
receiving a switch signal;
selecting which one of the front-end transmit and receive poles is to be coupled to which one of the plurality of front-end throws; and
selecting which one of the back-end transmit and receive poles is to be coupled to which one of the plurality of back-end throws.

14. The method of claim 11 further comprising:
receiving a second transmit communication signal at a transmit channel frequency converter coupled to the front-end multi-pole, multi-throw switch;
receiving a transmit reference signal at the transmit channel frequency converter;
producing a third transmit communication signal at the transmit channel frequency converter, the third transmit communication signal comprising a frequency-translated version of the second transmit communication signal;
receiving a second receive communication signal at a receive channel frequency converter coupled to the front-end multi-pole, multi-throw switch;
receiving a receive reference signal at the receive channel frequency converter; and
producing a third receive communication signal at the receive channel frequency converter, the third receive communication signal comprising a frequency-translated version of the second receive communication signal.

15. The method of claim 11, wherein the first one of the plurality of front-end throws is the second one of the plurality of front-end throws, the first one of the plurality of back-end throws is the second one of the plurality of back-end throws, the first one of the plurality of filters is the second one of the plurality of filters, and the first filter is the second filter.

16. The method of claim 11, wherein the first one of the plurality of front-end throws is different from the second one of the plurality of front-end throws, the first one of the plurality of back-end throws is different from the second one of the plurality of back-end throws, the first one of the plurality of filters is different from the second one of the plurality of filters, the first one of the plurality of filters has a first bandwidth, the second one of the plurality of filters has a second bandwidth, and the first bandwidth is different from the second bandwidth.

17. The method of claim 11, wherein the steps of switchably coupling the back-end transmit pole to a first one of the plurality of back-end throws, switchably coupling the front-end transmit pole to a first one of the plurality of front-end throws, switchably coupling the front-end receive pole to a second one of the plurality of front-end throws, and switchably coupling the back-end receive pole to a second one of the plurality of back-end throws include time division duplexing (TDD).

18. The method of claim 11, wherein the method utilizes frequency division duplexing (FDD) or a hybrid of time division duplexing (TDD) and FDD.

19. A method for a transmit and/or receive communication system for synchronously switching in filters having different bandwidths during communication signal transmission or communication signal reception, the transmit and/or receive communication system comprising a front-end multi-throw switch, a back-end multi-throw switch, and a plurality of filters, the front-end multi-throw switch including at least one front-end pole and a plurality of front-end throws, the back-end multi-throw switch including at least one back-end pole and a plurality of back-end throws, the plurality of filters interposed between the front-end and back-end multi-throw switches, the method comprising steps of:
receiving a communication signal during communication signal transmission or communication signal reception;
synchronously controlling states of the front-end multi-throw switch and states of the back-end multi-throw switch;
switchably coupling the at least one back-end pole to one of the plurality of back-end throws;
switchably coupling the at least one front-end pole to one of the plurality of front-end throws, the one of the plurality of front-end throws corresponding to the one of the plurality of back-end throws; and
completing a communication channel for the communication signal using at least the at least one back-end pole, the one of the plurality of back-end throws, one of the plurality of filters, the one of the plurality of front-end throws and the at least one front-end pole, the one of the plurality of filters connected between the one of the plurality of front-end throws and the one of the plurality of back-end throws.

20. The method of claim 19 further comprising:
receiving a switch command signal at a switch controller,
synchronously controlling states of the front-end multi-throw switch and states of the back-end multi-throw switch,
wherein the step of synchronously controlling states of the front-end multi-throw switch and states of the back-end multi-throw switch is performed in response to receiving the switch command signal.

21. The method of claim 19 further comprising:
receiving a switch signal;
selecting which one of the plurality of front-end throws is to be coupled to the at least one front-end pole; and
selecting which one of the plurality of back-end throws is to be coupled to the at least one back-end pole.

22. The method of claim 19 further comprising:
receiving a second communication signal at a channel frequency converter coupled to the front-end multi-throw switch;
receiving a reference signal at the channel frequency converter; and
producing a third communication signal at the transmit channel frequency converter, the third communication signal comprising a frequency-translated version of the second communication signal.

23. The method of claim 19 further comprising:
receiving a second communication signal during communication signal transmission or communication signal reception;
switchably coupling the at least one back-end pole to a second one of the plurality of back-end throws;
switchably coupling the at least one front-end pole to a second one of the plurality of front-end throws, the second one of the plurality of front-end throws corresponding to the second one of the plurality of back-end throws; and
completing a communication channel for the second communication signal using at least the at least one back-end pole, the second one of the plurality of back-end throws, a second one of the plurality of filters, the second one of the plurality of front-end throws and the at least one front-end pole, the second one of the plurality of filters connected between the second one of the plurality of front-end throws and the second one of the plurality of back-end throws, the one of the plurality of filters being different from the second one of the plurality of filters, the one of the plurality of filters having a first bandwidth, the second one of the plurality of filters having a second bandwidth, and the first bandwidth being different from the second bandwidth.

* * * * *

UNITED STATES PATENT AND TRADEMARK OFFICE
CERTIFICATE OF CORRECTION

| | | |
|---|---|---|
| PATENT NO. | : 7,231,189 B2 | Page 1 of 1 |
| APPLICATION NO. | : 11/594914 | |
| DATED | : June 12, 2007 | |
| INVENTOR(S) | : David A. Rowe, Craig A. Hornbuckle and Matthew D. Pope | |

It is certified that error appears in the above-identified patent and that said Letters Patent is hereby corrected as shown below:

In column 4, line 67, "coupled" should read -- couple --.

Signed and Sealed this

Twenty-ninth Day of April, 2008

JON W. DUDAS
*Director of the United States Patent and Trademark Office*